United States Patent [19]
Ferrari

[11] Patent Number: 5,949,352
[45] Date of Patent: Sep. 7, 1999

[54] SYSTEM AND METHOD FOR THE WIRELESS SIGNAL TRANSMISSION BETWEEN A MEASURING HEAD AND A REMOTE RECEIVER

[75] Inventor: Andrea Ferrari, Ferrara, Italy

[73] Assignee: Marposs Societa'Per Azioni, Bontivoglio, Italy

[21] Appl. No.: 08/945,240

[22] PCT Filed: May 6, 1996

[86] PCT No.: PCT/EP96/01875

§ 371 Date: Oct. 23, 1997

§ 102(e) Date: Oct. 23, 1997

[87] PCT Pub. No.: WO96/36029

PCT Pub. Date: Nov. 14, 1996

[30] Foreign Application Priority Data

May 11, 1995 [IT] Italy .............................. B095A 0226

[51] Int. Cl.[6] .................................................. G08B 21/00
[52] U.S. Cl. .................... 340/870.16; 340/680; 340/681; 340/870.23; 324/754; 324/756; 33/558; 33/561
[58] Field of Search ................ 33/558, 561; 340/870.16, 340/870.19, 870.22, 870.23, 678, 679, 680, 681; 324/754, 756, 757

[56] References Cited

U.S. PATENT DOCUMENTS

| | | | |
|---|---|---|---|
| 4,175,253 | 11/1979 | Pitegoff | 324/754 |
| 4,509,266 | 4/1985 | Cusack | 33/174 L |
| 4,864,294 | 9/1989 | Fukuhisa | 340/680 |
| 5,182,543 | 1/1993 | Siegel | 340/531 |
| 5,279,042 | 1/1994 | Gonzalez et al. | 340/870.16 |

OTHER PUBLICATIONS

Patent Abstracts of Japan from the European Patent Office for publication No. JP61023449, publication date Jan. 31, 1986, entitled "Transmission System" by Matsumoto Masahiro.

*Primary Examiner*—Michael Horabik
*Assistant Examiner*—Timothy Edwards, Jr.
*Attorney, Agent, or Firm*—Dickstein, Shapiro, Morin & Oshinsky LLP

[57] ABSTRACT

A system for transmitting a radio-frequency signal from a contact detecting probe (1), powered by a battery (4), to a remote interface (11), that includes the transmitting, by way of coded serial signals, of messages containing information regarding the state of the probe, the level of charge of its associated battery, and other possible control and identification information. In order to guarantee the repeatability of the delay time that cannot be avoided in the transmission of the change of state of the probe, the bit periods of the single bits that form the message are changed, with respect to a nominal bit period (TN) of the serial signal, on the basis of the delay or the advance at which there occurs the change of state, with respect to a theoretical instant (C0) pre-set within the nominal bit period. Each message comprises a number of bits that represent coded variables, and a start sequence (ST), clearly distinguishable with respect to the coded variables, and enabling the interruption of serial signals the transmission of which is in progress.

13 Claims, 3 Drawing Sheets

SYSTEM AND METHOD FOR THE WIRELESS SIGNAL TRANSMISSION BETWEEN A MEASURING HEAD AND A REMOTE RECEIVER

TECHNICAL FIELD

The present invention relates to a system for the wireless signal transmission between a checking probe and a remote receiver, comprising a sensor located in the probe, for detecting a change in the state of the probe and providing an associated checking signal, a signal generator, connected to the sensor and adapted for generating a signal comprising information about the state of the probe, and a timing generator connected to the signal generator.

Furthermore, the invention relates to a method for the wireless transmission of a signal between a checking probe and a remote receiver, the probe having sensor for detecting a change of state of the probe and a transmitter section, the method comprising the steps of generating and transmitting, by the transmitter section, a signal comprising information regarding the state of the probe, detecting the change of state of the probe, and modifying said signal to change said information about the state of the probe.

BACKGROUND ART

Measuring systems are known, for use on numerical control machines, for determining the position and/or the dimensions of mechanical workpieces, for example by means of contact detecting probes, mounted on the machine, that wireless transmit signals to remote receiver units, displace, in the course of the measuring cycles, with respect to the workpiece, contact the surface to be checked by means of a stylus, and, in consequence of the contact, modify some features of the wireless transmitted signals. Each receiver unit is connected in its turn, by means of an interface unit, with the associated numerical control unit that, by processing other signals relating to the spatial position of the probe, achieves information about the position of the workpiece surfaces.

Probes can be equipped with electric batteries for the power supply of contact detecting circuits and transmission devices. The wireless transmission can occur, for example, by sending electromagnetic signals of optical or radio-frequency type.

A contact detecting probe including a wireless infrared transmission system is disclosed in patent U.S. Pat. No. 4,509,266, according to which the information about the contact between the stylus of the probe and a workpiece is represented by a shift in the frequency of the optical signal transmitted.

In order to identify with a suitable amount of accuracy the instant when contact occurs, it is necessary that the delays—that necessarily arise in the course of the transmission of the state of the probe—be sufficiently short and repeatable.

A method for achieving a good repeatability, in systems of digital type, is that of utilizing a serial transmission of asynchronous type: in this case a message, consisting of a definite bit sequence, is immediately sent, in an asynchronous way with respect to the sequence of the serial signal, the moment when the probe detects the change of state. The information indicating the exact moment when there occurs the change in the state of the probe is implicitly given by the message end.

However, since for the asynchronous transmission there must be employed a receiver that is extremely quick in synchronising with the received signal, such method is rather sensitive to noise. Especially in the case of radio-frequency transmission, a synchronous transmission is undoubtedly preferable since, owing to the fact that it is possible to extract in the receiver a signal of synchronism of remarkable stability, it assures a major immunity against noise.

Every transmission of electromagnetic signals of synchronous type sets the need for a time resolution given by the bit period, so necessarily introducing an inaccuracy, of an equal entity, in the delay time.

In order to minimize the aforementioned inaccuracy, one could envisage the use of a sufficiently high bit rate, in other terms bit periods as short as possible. However, this would mean the employing of broad transmission bandwidths and their use may not be in compliance with the radio communication regulations, or limiting the total number of available channels.

It should also be considered that, for safety reasons, in the course of the operation of contact detecting probes with wireless transmission systems, the transmitter on board of the probe periodically sends to the receiver, connected to the machine control unit, a message of state that, in addition to confirming the current state of the probe, enables to test the operation of the transmission system. In the event that, as a periodical message of state is being transmitted, there is a change in the state of the probe, there may occur malfunctions owing to the fact that, while it is necessary to wait for the end of the message in the course of transmission, before sending the new message containing the change of state information, a non repeatable casual delay is added. A method for overcoming this inconvenience consists in inserting in any case, before starting the transmission of a message containing the information regarding the change of state, a fixed delay time that is sufficient for ensuring that any possible message in the course of transmission has ended. Nevertheless, it is obvious that this method, even though ensuring repeatability, increases the overall transmission time.

DISCLOSURE OF THE INVENTION

Object of the present invention is to provide a system and a method for performing the wireless transmission of electromagnetic signals between contact detecting probes and remote receiver units, that ensures, in a simple and cheap way, the transmission, within short and repeatable times, of any change in the state of the probe.

This object is achieved by a system and an associated method according to claims 1 and 7.

An advantage offered by the invention consists in guaranteeing the repeatability of the transmission delay without adding to the information transmitted by the probe to the remote receiver any specific data on said delay: in this way the overall time for the message transmission does not increase, and the delay is limited.

BRIEF DESCRIPTION OF THE DRAWINGS

A preferred embodiment of the invention is hereinafter described in more detail with reference to the enclosed drawings, given by way of non limiting example, wherein.

BEST MODE FOR CARRYING OUT THE INVENTION

Figure 1:
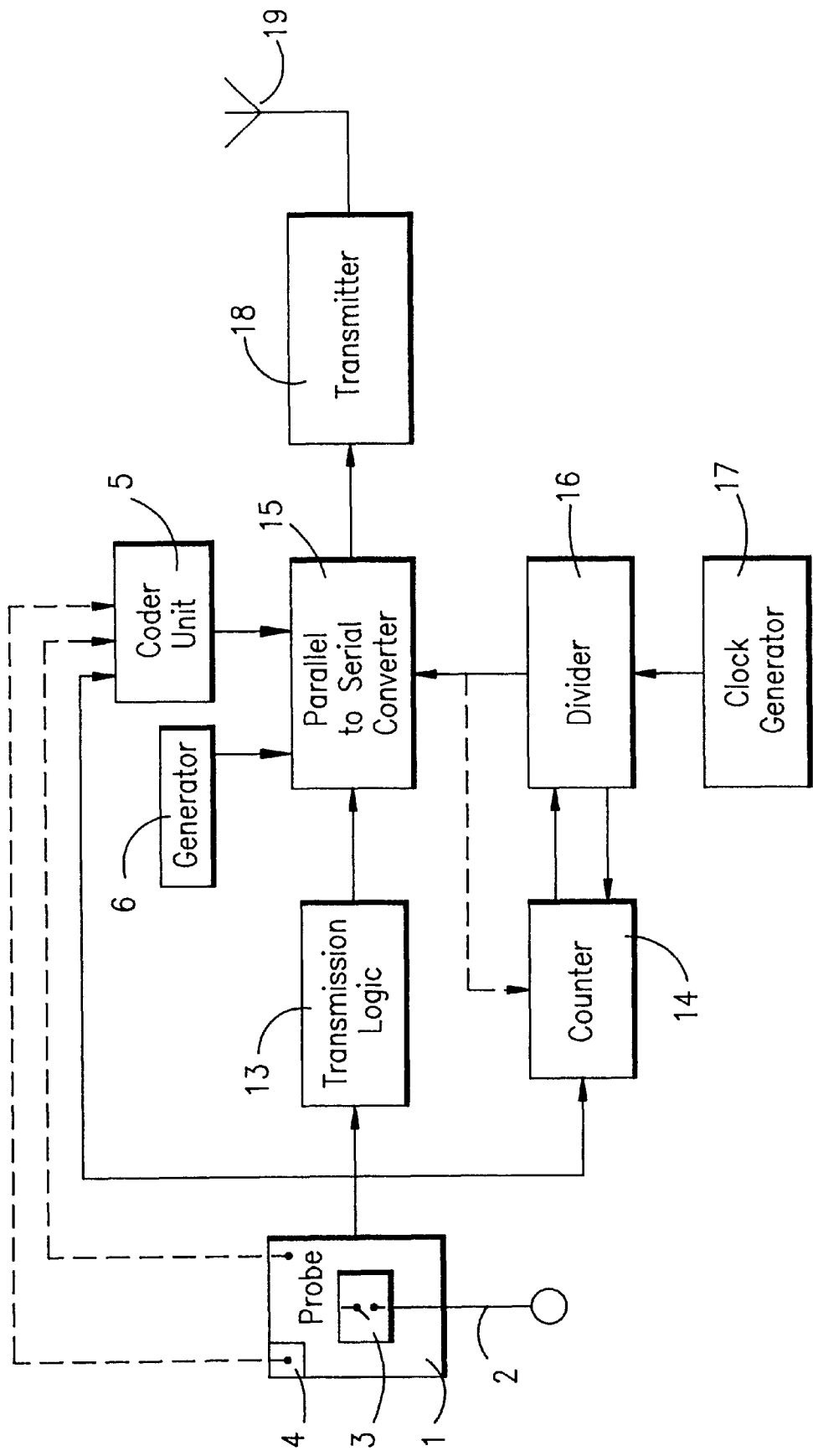
FIG. 1 is a block diagram of a transmitter section connected to a contact detecting probe.
Figure 2:
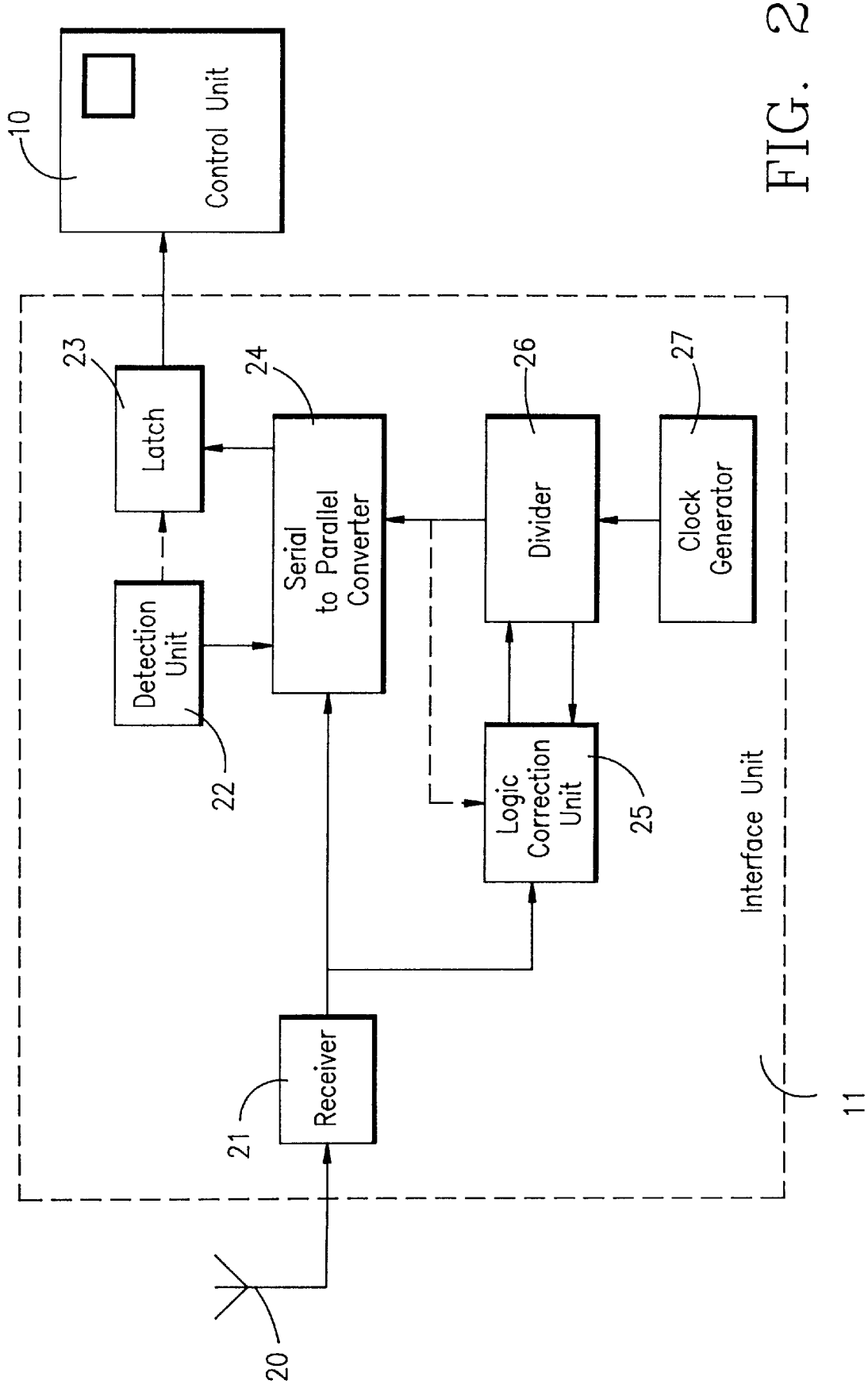
FIG. 2 is a block diagram of a receiver section of an interface unit.

FIGS. 1 and 2 illustrate, in simplified form, a system comprising a checking probe with detecting means for providing control signals, more specifically, a contact detecting probe 1, mounted on a machine tool (for example a lathe, or a machining centre), comprising a numerical control unit 10 and an interface unit 11. Unit 11 is located at a certain distance from probe 1, and comprises a receiver section (see FIG. 2), i.e. a remote receiver for receiving wireless signals, for example radio-frequency signals, transmitted by probe 1.

With reference to the diagram shown in FIG. 1, probe 1 comprises a movable arm 2 with a feeler for -contacting a mechanical workpiece, and a sensor 3, for example a switch device, that detects the displacements of arm 2 and provides switch signals representing changes in the state of the probe. A power supply source, for example a battery 4, is mounted on the probe for the power supply of both the switch device 3 and a transmitter section connected to it. The transmitter section comprises a signal generator, with a transmission logic 13, connected to the switch device 3, a coder unit 5, and a parallel to serial converter 15, connected to a FM radio-frequency transmitter 18, with an aerial 19. Converter 15 has an input connected to a "start" generator 6, and generates a coded serial signal comprising messages consisting of sequences of bits of a prefixed period, as hereinafter described. The input of coder unit 5 receives signals relating to the state of the probe and of battery 4, and other possible information regarding the probe.

The switch device 3 is also connected to a detector with a counter 14. A timing generator includes a "clock" generator 17 and a programmable divider 16. The clock generator 17 sends pulses at a frequency of, say, 1 MHz to the programmable divider 16, that forms a generator unit for supplying, in its turn, to the converter 15, pulses defining the bit periods of the coded serial signal. The programmable divider 16 is also connected to the counter 14, and interacts with it, as hereinafter described.

FIG. 2 shows the receiver section of interface unit 11, that comprises an aerial 20, a radio-frequency FM receiver 21 and a serial to parallel converter 24. Receiver 21 and converter 24 are connected to a digital section for the extraction of synchronism, that comprises a "clock" generator 27, a programmable divider 26, and a logic correction unit 25.

A detection unit 22 and a latch 23 are connected to converter 24. The latch 23, that also receives an enable control arriving from unit 22, is connected to the machine numerical control unit 10.

The system operates in the following way.

Figure 3:
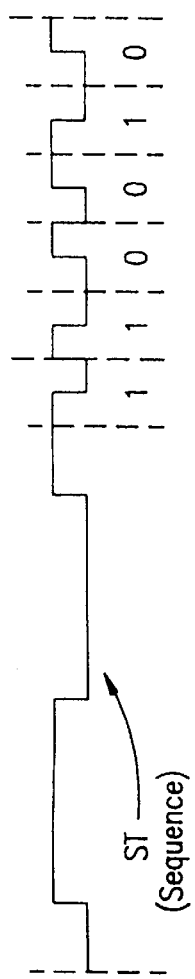
FIG. 3 is a diagram showing a coded serial signal; and in FIG. 4 the diagrams show the transmission of messages by way of serial signals.

In the course of a checking cycle performed on a machine tool by a probe 1, converter IS continuously transmits, by means of the FM transmitter 18 and aerial 19, a coded serial signal, containing messages consisting of sequences of bits of a prefixed period. These messages comprise, in general, a constant part, or sequence of "start", generated by generator 6, that identifies the start of the message, and a part with variable values, generated by coder 5, that represent, for example, the state of the probe and that of the battery and possibly other information, like identification codes and control information. The variables are coded in coder 5 in a known way, for example according to the so-called "Manchester code", according to which the logic values "0" and "1" are coded as transitions in one and in the other direction, respectively, between two signal levels (an example is shown in FIG. 3). This code offers particular advantages in that it generates redundant signals with a null average value, and offers the possibility of obtaining a constant sequence of "start" that can be easily identified with respect to the other coded variables, in order to easily and safely interrupt the coded serial sequence of messages whenever a change in the state of the probe occurs (see, for example, the sequence ST in FIG. 3).

In any case, other possible known coding methods, generally with a null average value, can be utilized.

When arm 2 of probe 1 moves, in consequence of contact with a workpiece, the switch device 3 changes state and generates a switch signal. This signal, coded in unit 5, changes the contents of converter 15. The transmission logic 13 generates a pulse when a new message has to be sent. A new message is sent at the end of the preceding one or, without waiting for the end of the message in the course of transmission, every time a change in the state of probe 1 occurs. The parallel to serial converter 15 is loaded whenever a pulse arrives from the transmission logic 13 and thus, starting from the subsequent pulse that arrives from the programmable divider 16, converts its contents in a coded serial form. The so generated serial message reaches the input of the FM transmitter 18 and is irradiated by aerial 19.

With further reference to FIG. 1, the three blocks 14, 16 and 17 interact for generating pulses that define the periods of the bits of the coded serial signal.

On the basis of the clock frequency supplied by generator 17, the programmable divider 16 generates pulses that set a nominal bit period TN (for example 50 $\mu$sec), corresponding to a nominal transmission frequency that generally occurs when there is no switch signal indicating a change in the state of probe 1. Divider 16 sets the bit periods on the ground of the information, provided by counter 14 (that receives the pulses generated by divider 16), revealing the moment when there occurs a change in the state of probe 1 within the period of time defined by the nominal bit period TN. The bit period of at least some bits of the message is slightly altered, increased or diminished, in order to keep substantially constant the time delay between the change of state, as it has been monitored by the switch device 3, and the end of the message. In this way, even though the message relating to a change in the state of probe 1 is sent only after the first pulse (generated by the programmable divider 16 and sent to the converter 15) that follows the change of state, and thus after a variable delay, the formerly mentioned variable delay does not alter in a substantial way the value of the time delay that elapses between the change of state and the end of the associated transmitted message. Thus, the message received and decoded by interface unit 11 makes it possible to immediately go back to the instant of time when there occurred the change in the state of probe 1, on the basis of a constant delay time, and without the need of performing particular further processings.

Figure 4:
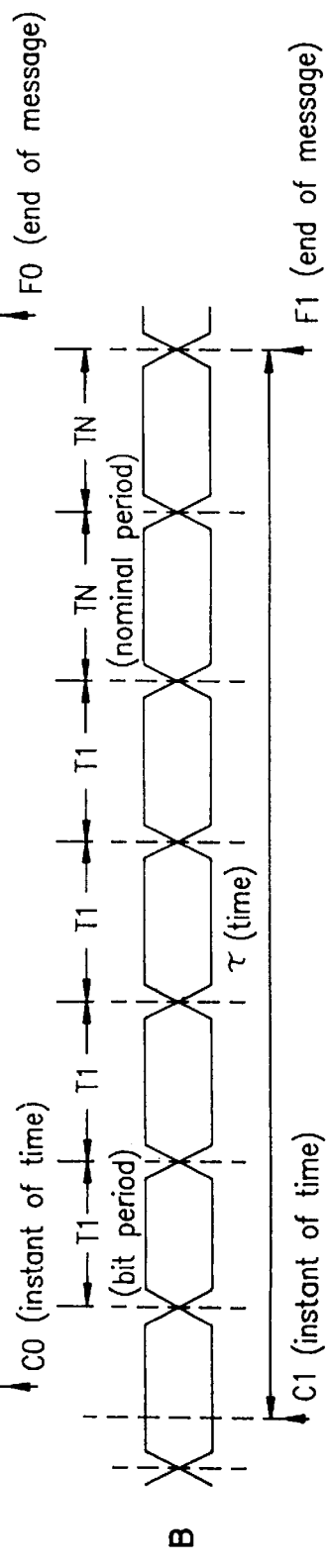

A possible embodiment is schematically shown in FIG. 4: if the change in the state of probe 1 occurs at a theoretical determined instant C0 within the nominal bit period TN, for example at the middle of the bit being transmitted at that moment, the bit period is left unchanged with respect to the nominal value TN (diagram A); if it occurs in advance with respect to that instant of time C0, for example in the first half of the bit (C1), the following transmitted bits (representing the first ones of the new message) are transmitted with a slightly shorter bit period TI, until wholly making up for the advance (diagram B); lastly, if it occurs with a delay with respect to the theoretical instant C0, for example in the second half of the bit (C2), the bit period is increased (T2) until totally making up for the delay (diagram C). In any case, whatever the time lag between the theoretical instant C0 and the change of state instant may be, the time τ that elapses between the moment when the probe changes state and the end of the message (F0, F1 or F2) is held constant.

While in the diagrams of FIG. 4 the number of bits forming a message is limited to six, for purposes of simplicity and clarity, in practice that number is generally larger (for example 26). Consequently, a slight variation of the bit period of some bits is sufficient to guarantee the constancy of the time τ elapsing between the change in the state of the probe 1 and the end of the transmission, by converter 15, of the message.

In practice, according to the diagram shown in FIG. 1, the bit period defined by divider 16 is slightly altered (for example ±1 μgsec), depending on the value received from counter 14. In the latter, every time there occurs a change in the state of probe 1, a value is loaded from the programmable divider 16. The module of such value represents the number of bits of the message, the bit period of which must be altered in order to hold the delay constant, and its sign indicates whether the bit period has to be increased or diminished. More specifically, if the change of state occurs at a moment corresponding to the central instant (C0) of the bit being transmitted at that moment, in counter 14 there is loaded value 0, if the change occurs in the course of the first half of the bit (C1), there is loaded a negative value that represents the distance in time of the state change from the central instant (C0) of the bit, otherwise (C2) there is loaded a positive value that represents the distance in time of the change of state from the central instant (C0) of the bit (in the actual hereinbefore described case, the value loaded in counter 14 may vary from −25 to +25).

Consequently, if the value of counter 14 is 0, the bit period determined by divider 16 assumes the nominal value TN (for example 50 μsec), if it is a negative value, it assumes the minimum value (for example 49 μsec) and if it is a positive value it assumes the maximum value (for example 51 μsec).

Each time divider 16 sends a new pulse to converter 15 for the transmission of a new bit of the message, counter 14 is increased if it contains a negative value, or decreased if it contains a positive value, until reaching value 0.

The radio signal, transmitted by transmitter 18 via aerial 19, is received by the receiver aerial 20 and reaches FM receiver 21 of interface unit 11. Clock generator 27 generates a reference frequency (for example 1 MHz) that is provided to the input of the programmable divider 26. Divider 26 has a nominal division value (for example 50) that can be changed depending on a correction value arriving from the logic unit 25. The formerly mentioned value is algebraically added to the nominal value for obtaining the real division value. Each time programmable divider 26 "reaches" the middle of the nominal division value (for example 25), it generates and sends to the serial to parallel converter 24 a synchronism pulse. Logic unit 25 re-determines the correction value every time there occurs a change in the state of the signal output from FM receiver 21, on the basis of the value that the programmable divider 26 assumes at that same instant, thus fixing the subsequent division value. The extraction of synchronism in the reception condition is facilitated by the redundancy of the Manchester code chosen for generating the serial message.

As the purpose of the logic correction unit 25 is that of holding the reception synchronism in phase with the transmission one, the correction value set by unit 25 will be such to correct the advances or the delays in the synchronism pulse of the receiver with respect to a theoretical instant, that in the illustrated example, is conventionally defined as the central instant of every received bit. A simple algorithm that can be implemented by logic unit 25 consists in measuring the distance, in periods of the clock generator 27, between every change of state of the signal output by the FM receiver 21 and the instant in which the programmable divider 26 is reloaded, i.e. it "reaches" the middle of the nominal division value. The correction value is then determined by dividing said algebraical difference by a constant value (for example 8). The synchronism pulses, generated by the programmable divider 26, are utilized for loading the serial message in the serial to parallel converter 24. The detection unit 22 analyses for correctness the entire message, that is the start sequence, the redundant coding (for example according to the Manchester code) and the control bits and, finally, enables the latch 23 to update the values identifying the state of probe 1, of battery 4 and any other variable present in the message.

Thereafter, these values are provided to the numerical control unit 10, that employs them for obtaining information regarding the checking cycle.

It should be realized that in a system according to the invention, FM transmitter 18 and the corresponding receiver 21 can be replaced by transmitters and receivers with another modulation (for example amplitude or "spread-spectrum" modulations) or that do not utilize radio-frequency (for example infrared optical systems).

Furthermore, the formerly mentioned transmission system may be also utilized in applications on machine tools and/or measuring machines, wherein the value to be transmitted is not simply the state of the switch of a contact detecting probe, but a numerical value provided by a measuring head (by means of different detecting means), that measures the amount of deflection of the stylus, applications wherein presumably the transmission delay is still critical.

Other modifications for the embodiment of a system and a method according to the invention can be made with respect to what has been illustrated and described hereinbefore. For example, depending on the delay of the change in the state of probe 1, it is possible to vary the nominal frequency provided by divider 16 in a substantially continuous way, in other terms by varying in a homogeneous way the bit period of each of the bits forming the message. Just a partial embodiment of the method herein described is obviously feasible, depending on the repeatability level that the system is expected to perform to.

According to another possible variant, that enables to limit the power consumption of battery 4, there is foreseen that, in the absence of changes in the state of probe 10, transmission logic 13 sends pulses at certain time intervals, and that, during the interval between two sequential transmissions, it deactivates the FM transmitter 18, that generally is the element of major consumption. In this case it is preferable to suitably broaden the constant part of the serially transmitted message, by inserting before the start sequence a "preamble" consisting of a sequence of bits of alternating values that is sufficient for guaranteeing the extraction of synchronism in interface unit 11. The time elapsing between two transmissions is determined in such a way as to be less than the braking times of the movable parts of the machine whereupon the probe performs the checking cycle, so that in the event an accidental failure in the transmission system occurs, there be prevented in any case an undesired impact between probe 1 and, for example, a mechanical part of the machine.

I claim:

1. A system for the wireless signal transmission between a checking probe (1) and a remote receiver (11), comprising:
   - a sensor (3) located in the probe (1), for detecting a change in the state of the probe (1) and providing an associated checking signal;
   - a signal generator (5, 6, 13, 15), connected to the sensor (3) and adapted for generating a signal comprising information about the state of the probe; and
   - a timing generator (16, 17) connected to the signal generator characterized in that, said signal generator (5, 6, 13, 15) is adapted to generate a serial signal with a sequence of bits, coded to comprise said information about the state of the probe, said timing generator (16, 17) is adapted to define a nominal bit period (TN) for the bits of said sequence, and in that the system further comprises:
   - a detector (14), connected both to the sensor (3), for revealing the instant (C1, C2) within said nominal bit period (TN) when there occurs a change in the state of the probe (1) on the basis of the checking signal, and to the timing generator (16, 17) for changing, according to said instant (C1, C2), the bit period (T1, T2) of at least one of the bits of said sequence in such a way that the time elapsing between the instant (C1, C2) of change of state and the end (F1, F2) of the sequence of bits assumes a substantially constant value ($\tau$).

2. A transmission system according to claim 1, wherein said probe is a contact detecting probe (1), and the sensor comprises a switch device (3) for providing a switch signal in consequence to a change of state of the probe (1), said switch device (3) being connected to the detector means (14).

3. A system according to claim 2, wherein said signal generator (5, 6, 13, 15) comprises a start generator (6) and a coder unit (5) for generating said sequence of bits, the start generator (6) being adapted for generating a constant signal (ST) that identifies the start of said sequence of bits.

4. A system according to claim 3, wherein the timing generator comprises:
   - a clock generator (17) and a generator unit (16) connected to the clock generator (17) for generating the bit periods of said bits, said detector comprising:
     - a counter (14) connected to the generator unit (16) for changing the bit period (T1, T2) of said at least one bit with respect to the nominal bit period (TN).

5. A system according to one of the preceding claims, wherein the remote receiver (11) comprises a digital section for the extraction of synchronism (25, 26, 27) with a logic correction unit (25) adapted for detecting and correcting the variations in the bit periods with respect to the nominal bit period (TN).

6. A system according to one of the preceding claims, comprising a radio-frequency transmitter (18) and a radio-frequency receiver (21), connected to the probe (1) and to the remote receiver (11), respectively, for the wireless transmission of said sequence of bits from the probe (1) to the remote receiver (21).

7. A method for the wireless transmission of a signal between a checking probe (1) and a remote receiver (11), the probe (1) having a sensor (3) for detecting a change of state of the probe and a transmitter section (13–19), the method comprising the steps of:
   - generating and transmitting, by the transmitter section (13–19), a signal comprising information regarding the state of the probe (1),
   - detecting the change of state of the probe (1), and
   - modifying said signal to change said information about the state of the probe,
   - characterized by the fact that said signal is a coded serial signal comprising a sequence of bits with a nominal bit period (TN), said sequence of bits being coded to comprise said information regarding the state of the probe (1), the method further comprising the steps of:
     - detecting the instant (C1, C2), within said nominal bit period (TN), at which the change of the state occurs, and altering the bit period (T1, T2) of at least one of the bits of said sequence, in such a way that the time elapsing between the instant (C1, C2) of change of state and the end (F1, F2) of the sequence of bits assumes a substantially constant value ($\tau$).

8. The method according to claim 7, in a system in which said checking probe is a contact detecting probe (1) with a switch device (3) for generating a switch signal, wherein said switch signal detects a change in the state of the probe (1).

9. The method according to claim 8, wherein the serial signal is sent from the transmitter section of the probe (1) to the remote receiver (11) by means of a radio-frequency transmission.

10. The method according to claim 9, wherein the nominal bit period (TN) defines a theoretical instant (C0) for the change of state of the probe (1), the time lag between the instant when the change occurs (C1, C2) and said theoretical instant (C0) being detected, and said bit period of at least one bit of the sequence being consequently altered.

11. The method according to claim 10, wherein the coded serial signal comprises a variable part coded according to a coding of a null average value.

12. The method according to claim 11, wherein said coding is of the Manchester type.

13. The method according to any one of claims from 7 to 12, wherein the sequence of bits comprises a constant part (ST) that identifies the start of said sequence of bits.

* * * * *

UNITED STATES PATENT AND TRADEMARK OFFICE
CERTIFICATE OF CORRECTION

PATENT NO. : 5,949,352
DATED : September 7, 1999
INVENTOR(S) : Andrea Ferrari

It is certified that error appears in the above-identified patent and that said Letters Patent is hereby corrected as shown below:

Column 3, line 56, cancel "IS", substitute --15--.
Column 5, line 19, cancel "µgsec", substitute --µsec--.
Column 7 – Claim 2, line 5, cancel "means".
Column 8 – Claim 6, line 1, cancel "one of the preceding claims", substitute --claim 5--.

UNITED STATES PATENT AND TRADEMARK OFFICE
CERTIFICATE OF CORRECTION

PATENT NO. : 5,949,352
DATED : September 7, 1999
INVENTOR(S) : Andrea Ferrari

It is certified that error appears in the above-identified patent and that said Letters Patent is hereby corrected as shown below:

Fig. 2 should be:

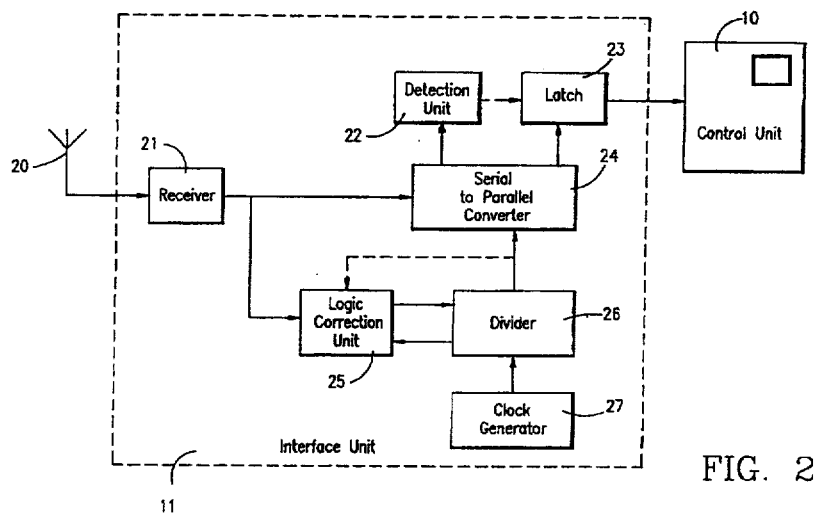

FIG. 2

Signed and Sealed this

Fifteenth Day of August, 2000

Attest:

Q. TODD DICKINSON

*Attesting Officer*      *Director of Patents and Trademarks*